US007417706B2

(12) United States Patent
Holmes (10) Patent No.: US 7,417,706 B2
(45) Date of Patent: Aug. 26, 2008

(54) BEAM STEERING DEVICE (75) Inventor: Melanie Holmes, Woodbridge (GB)

(73) Assignee: Thomas Swan and Co. Ltd., Co. Durham (GB)

( * ) Notice: Subject to any disclaimer, the term of this patent is extended or adjusted under 35 U.S.C. 154(b) by 0 days.

(21) Appl. No.: 11/438,710

(22) Filed: May 22, 2006

(65) Prior Publication Data

US 2006/0209250 A1 Sep. 21, 2006

Related U.S. Application Data (63) Continuation of application No. 10/472,641, filed as application No. PCT/GB02/01464 on Mar. 27, 2002, now abandoned.

(30) Foreign Application Priority Data

Mar. 28, 2001 (GB) ................... 0107742.9

(51) Int. Cl.
*G02F 1/13* (2006.01)
(52) U.S. Cl. .................. 349/202; 349/201; 349/113
(58) Field of Classification Search ............. 349/202, 349/201, 113
See application file for complete search history.

(56) References Cited

U.S. PATENT DOCUMENTS 5,566,007 A * 10/1996 Ikeda et al. ............... 349/5
6,091,463 A * 7/2000 Robinson et al. ........... 349/25
6,348,995 B1 * 2/2002 Hansen et al. ............. 359/486

FOREIGN PATENT DOCUMENTS

EP    0 856767 A2    8/1998
EP    0 899606 A2    3/1999

OTHER PUBLICATIONS

D. Ulrich, et al., "A Diffraction Based Polarisation Independent Lightbalve".IEE Colloquium, London, Mar. 2000.
W A Crossland., et al., "Beam Steering Optical Switches Using LCOS: The "ROSES"Demonstrator", IEE Colloquium, London, Mar. 2000.

* cited by examiner

*Primary Examiner*—Andrew Schechter
*Assistant Examiner*—Lucy P Chien
(74) *Attorney, Agent, or Firm*—Allston L. Jones (57) ABSTRACT A beam steering device uses a liquid crystal with an array of back electrodes. Voltages are applied to the array to cause a desired phase distribution across the array, the distribution being selected to steer a beam incident upon the array into a desired direction. Reflective elements are disposed to reflect light incident in the spaces between the electrodes to reduce losses and to smooth the transitions in phase between adjacent electrodes.

23 Claims, 9 Drawing Sheets

BEAM STEERING DEVICE

CROSS REFERENCE

This application is a continuation of Ser. No. 10/472,641, filed Mar. 15, 2004, which is a PCT National Phase Application the claims priority from PCT/GB02/01464 having an International filing date of 27 Mar. 2002 now abandoned which in turn claims priority from UK patent application GB0107742.9 filed 28 Mar. 2001.

The present invention relates to a beam steering device, to a method of steering a beam of light and to a routing switch.

Beam steering may be effected by liquid crystal over silicon spatial light modulators (SLMs) consisting of an array of pixellated elements, each formed by a back-reflecting electrode, a front-electrode on a cover glass that is often common to all the pixels, and inbetween the two electrodes a layer of liquid crystal to which an electric field is applied using the front and back electrodes. There may also be intermediate optical layers between the liquid crystal and back electrode. The drive circuits for the back and front electrodes may form part of an underlying silicon backplane, or be disposed on that backplane. Optical quality planarisation, as is required in VLSI manufacturing to enable sub-micron optical lithography, can be used over the drive circuit components such that the back electrodes are deposited on an optical quality surface and therefore may act also as a high quality mirror. In certain SLMs, the main subject of this invention, individual back electrodes are isolated electrically by a 'dead-space' formed between them, for example by etching.

Such SLMs may be formed using a silicon process to provide a liquid crystal over silicon spatial light modulator. In such a device, typically the width of the dead-space is between one and two times the minimum feature size of the CMOS process.

SLMs using liquid crystals are attractive for signal processing applications in that they allow modulation of light phase and/or amplitude and/or birefringence. Both binary phase and multiple (>2 levels) phase modulation can be implemented in a polarisation-independent manner, allowing the construction of beam-steering devices for communications routing applications. Multiple-phase modulating arrays are particularly attractive for optical routing applications because they can be used to mimic the effect of a tiltable mirror and steer beams between source(s) and receiver(s). Beam steering devices using SLMs display hologram patterns on arrays of pixellated elements with the pixels being separately controllable so as to select the pitch of the hologram grating. By using multiple phase liquid crystals the phase difference from pixel-to-pixel can be controlled as desired. Critical performance requirements for optical routing are insertion loss, crosstalk, switch reconfiguration time and physical size, the latter especially so in metro area applications where routing nodes may often be located in customer premises.

Crossbar switch design studies show that the physical length of a switch is proportional to the square of the pixel pitch. Other types of routing architectures have lengths that may be linearly proportional to the pixel pitch. Hence compact optical switches will require SLMs with very small pixels. However, the insertion loss is also an important parameter: for multiple phase modulating SLMs, the fundamental limit to the insertion loss is set by the relative width of the dead-space, compared to the pixel pitch. Practically this sets a lower limit to the pixel pitch and hence to the switch physical size. One way to overcome this limit is to use a CMOS process with a smaller feature size and hence reduce the dead-space width, which allows a reduction in the pixel pitch for the same insertion loss penalty. However, smaller CMOS processes are associated with lower operating voltages and hence may require a thicker cell for the same range of phase modulation. This increases the switch reconfiguration time. Although this problem may be addressed by higher supply voltages and high voltage transistors, the maximum available voltage still decreases with reducing feature size. Another problem with the dead-space is what happens to the light that passes through: it may bounce around inside the substrate and emerge elsewhere (coming back out through another dead-space) causing crosstalk.

A paper entitled "A diffraction based polarisation independent light valve" (D. Ulrich, C. Tombling, J. Slack, P. Bonnett, B. Henley, M. Robinson and D. Anderson) was presented at a meeting of the Institution of Electrical Engineers on 17 Mar. 2000. This paper discusses the use of diffractive LC light valves for projection displays and projection and viewer systems. In a device having front electrodes in the form of plural linear strips, and plural rear pixel electrodes defining the pixels, with the front and rear electrodes sandwiching a liquid crystal, it is acknowledged that to provide high contrast ratio the gaps between the pixels should have an underlying mirror. In the described light valve, the period of the grating is fixed as the pitch of the front strip electrodes. Control of the voltage on the rear electrode is used to create a fixed pitch grating of variable efficiency. In the described embodiment, there are four front electrodes per pixel. Where these front electrodes are driven with +V, −V, +V, −V, it will be seen that to the side of the inter-pixel gap there will be one front electrode at +V and one front electrode at −V. The effect of the underlying mirror electrodes in the inter-pixel gap is said to be to minimise diffraction. It is suggested in the paper that the underlying mirror could be included in a VLSI backplane by modifying the lightshield processes used to protect the silicon devices from visible radiation.

An embodiment of the described method of the present invention exploits correlation effects between the director orientation of adjacent liquid crystal molecules and also the potential for multiple overlying layers of circuitry in state-of-the-art CMOS manufacturing.

Embodiments of the invention provide three significant improvements in device performance by making the dead-space reflective. In a first embodiment the loss penalty due to the dead-space is reduced significantly. In a second embodiment, for an acceptable loss penalty, much smaller pixels may be used, allowing the fabrication of much more compact optical switches. In a third embodiment, for an acceptable loss penalty, larger CMOS processes may be used allowing the fabrication of switches with a faster reconfiguration time (see above). Embodiments also provide improved crosstalk as the light incident on the dead-space is reflected back out again instead of bouncing around inside the substrate.

According to a first general aspect of the invention there is provided a device for steering a beam of light, the device comprising an array of elements, said beam of light being incident upon said array of elements, each element having a reflective back electrode and a front electrode, the back and front electrodes being disposed respectively behind and in front of a liquid crystal layer, the back electrodes being spaced apart to define said array, and a reflective layer disposed behind the back electrodes to reflect light incident in the spaces to between the back electrodes substantially in phase with the light reflected from the back electrodes.

The beam steering device of the invention allows a ramped phased shift, for example a piecewise linear phase distribution, to be created across an array of elements to direct the beam of light incident on the array to the desired direction.

Thus the device of the invention is capable of routing light beams to selectable directions by setting up a desired phase distribution across an array of phase modulating elements, and using that distribution across the array to steer light incident upon the array. Although the voltages to create the phase shifts may be spatially periodic, the physical form of the device does not constrain the spatial periodicity nor the phase distribution, excepting the constraint of the maximum available phase modulation. In the context of a display it is desirable to create a white pixel on a screen by deflecting a beam incident on a single pixel electrode by a first fixed amount, and to create a black pixel on the screen by specular reflection of that beam, followed by its absorption: this desideratum can be met by a fixed diffraction grating per pixel which can be turned on or off. It will be appreciated by those skilled in the art that while a fixed grating can be used to switch between two directions, it is not capable of switching between several different directions. For multidirectional steering, a fixed grating is inappropriate.

In one embodiment there is provided a single front electrode per element.

In a preferred embodiment, the front electrode is common to the array of elements.

In one embodiment the device has drive circuitry on a substrate, and a planarising layer disposed on said drive circuitry, the back electrodes are disposed on said planarising layer, and respective wirings pass through the planarising layer from the back electrodes to the drive circuitry, and a portion of the drive circuitry provides the reflective layer.

In another embodiment drive circuitry is disposed on a substrate, and a planarising layer is disposed on said drive circuitry, wherein said back electrodes are disposed on said layer, respective wirings passing through said planarising layer from said back electrodes to said drive circuitry, and wherein said reflective layer is disposed within said planarising layer.

In yet another embodiment drive circuitry is disposed on a substrate, a first planarising layer is disposed on said drive circuitry wherein said reflective layer is disposed on said first planarising layer, and a second planarising layer is disposed on said reflective layer and said first planarising layer wherein said back electrodes are disposed on said second planarising layer, wherein respective wirings pass through said planarising layers from said back electrodes to said drive circuitry.

Advantageously a further planarising layer is disposed over or level with said back electrodes.

Conveniently a waveplate is disposed over said back electrodes.

Conveniently said reflective layer is composed of metal.

In one embodiment said reflective layer extends only to substantially fill said spaces between said back electrodes.

In another said reflective layer extends beneath said back electrodes.

In yet another said reflective layer extends only partway across said spaces.

Conveniently the device further comprises circuitry for connecting at least a portion of said reflective layer to a selected potential.

In another embodiment, each element has plural front electrodes.

According to a second aspect of the invention there is provided an optical routing switch comprising at least one beam steering device in accordance with the first aspect of the invention.

According to a third aspect of the invention there is provided a method of steering light having a first direction to a desired second direction, the method comprising:

causing a beam of said light to be incident upon a reflective liquid crystal device;

selecting a desired spatial phase modulation characteristic for said liquid crystal device thereby to provide a deflection from said first direction to said second direction; and providing a spatial distribution of phase levels across said liquid crystal device to at least approximate to said desired characteristic;

wherein the step of providing a spatial distribution of phase levels comprises driving said liquid crystal at sequential spaced driving locations to produce rising discrete phase levels; and smoothing transitions in phase between said spaced driving locations by providing further locations between said spaced driving locations, and reflecting said light through said liquid crystal in said further locations.

By this means, even though the phase levels are discrete steps, the transitions are smooth and in embodiments this increases diffraction efficiency.

Conveniently said step of driving said liquid crystal comprises providing electrodes at said discrete driving locations, and applying voltages to sequential electrodes to cause said rising phase levels due to the liquid crystal.

Conveniently said step of smoothing comprises providing spaces between the electrodes at said further locations and providing reflective elements in the spaces and behind the electrodes.

By making use of the dead spaces between the electrodes, the performance of the SLM can actually be increased over an ideal SLM having no dead spaces between electrodes having discrete voltages applied thereto.

In one embodiment said electrodes are reflective whereby said liquid crystal device is reflective.

In another a reflective layer is disposed behind the electrodes whereby said liquid crystal device is reflective.

The step of providing reflective elements preferably comprises disposing the reflective elements at a distance behind said electrodes such that light reflected thereby leaves said liquid crystal device substantially in phase with light reflected by said electrodes.

Exemplary preferred embodiments of the invention will now be described with reference to the accompanying drawings, in which.

In the various figures, like reference numerals refer to like parts.

In the following paragraphs the insertion loss penalties and lower limits to the pixel pitch imposed by the dead-space as currently fabricated are described and quantified.

The effect of the dead-space on the diffraction efficiency is analysed by considering the modulation at the SLM (one or more of amplitude phase and birefringence) as the product of the modulation of an ideal SLM (with no dead-space) and a pixel 'window' function that has the value of 1 over the back electrodes, and 0 over the dead-space. To this product is added the modulation applied by the dead-space to whatever light is reflected from the optical planarising layer that is exposed between the back electrodes. Since this planarising layer may be quartz, with a refractive index close to that of the liquid crystal, it may be assumed to a first approximation that none of the light incident on the dead-space is reflected. Fourier analysis then shows that the diffraction efficiency into the intended beam-steering direction is reduced for a 2-D array of square pixels by a factor given in equation (1), where d is the width of the dead-space and p is the pixel pitch.

$$\text{actual 2-D efficiency} = (1-d/p)^4 \cdot \text{efficiency of ideal SLM} \quad (1)$$

Figure 1:
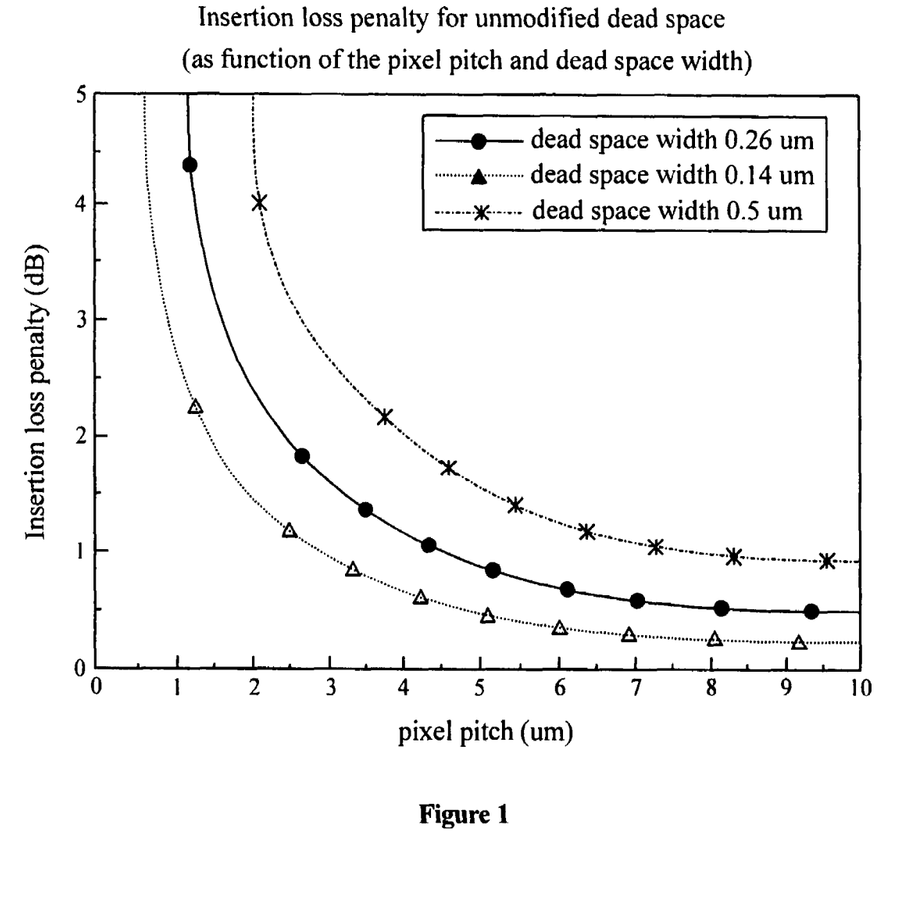
FIG. 1 shows the relationship of insertion loss to pixel pitch and dead-space width.

Referring to FIG. 1, the reduction factor is plotted as an insertion loss penalty (in dB) as a function of the pixel pitch, and for dead-space widths of 0.14 μm, 0.26 μm, 0.5 μm, corresponding to twice the minimum feature size of 70 nm, 0.13 μm and 0.25 μm CMOS processes respectively. This insertion loss penalty is for a single SLM.

However in many routing devices two SLMs are provided, and hence the switch insertion loss penalty would be twice the value shown in FIG. 1.

For the example of a 3 μm pixel pitch, the insertion loss penalty in a crossbar routing switch would be 6.3 dB for a dead-space width of 0.5 μm, decreasing to 3.1 dB and 1.6 dB for dead-space widths of 0.26 μm and 0.14 μm, respectively. The physical length of the beam-steering region inside such a crossbar switch is proportional to the square of the pixel pitch, and hence there is a direct trade-off between size and insertion loss.

For a 1-D array of (rectangular) pixels, the diffraction efficiency into the intended beam-steering direction is reduced by a factor given in equation (2).

$$\text{actual 1-D efficiency} = (1-d/p)^2 \cdot \text{efficiency of ideal SLM} \quad (2)$$

Hence the loss penalties for 1-D phase modulation can be obtained from FIG. 1 by halving the value shown in the graph.

Next is an explanation of the physics of polarisation-independent multiple phase modulation and a description of how the liquid crystal tends to behave in the regions between electrodes, i.e. above the dead-space, assuming that alignment is good and the dead-space narrow enough such that random domains or disclinations do not appear in this region.

As discussed in our co-pending patent application WO 01/25840, multiple phase modulation is conveniently achieved in liquid crystal by aligning the material such that under an applied field, the director (or more properly the uniaxial axis) changes its tilt in a plane perpendicular to the front and back electrodes. Polarisation-independent operation of a beam-steering SLM for routing applications may be achieved by depositing a quarter-wave plate on top of the back electrodes, with the orientation of the quarter-wave plate axes such that light polarised in the plane of the tilt of the director is reflected back through the SLM with its plane of polarisation perpendicular to the plane of the tilt, and vice versa.

Figure 2A:
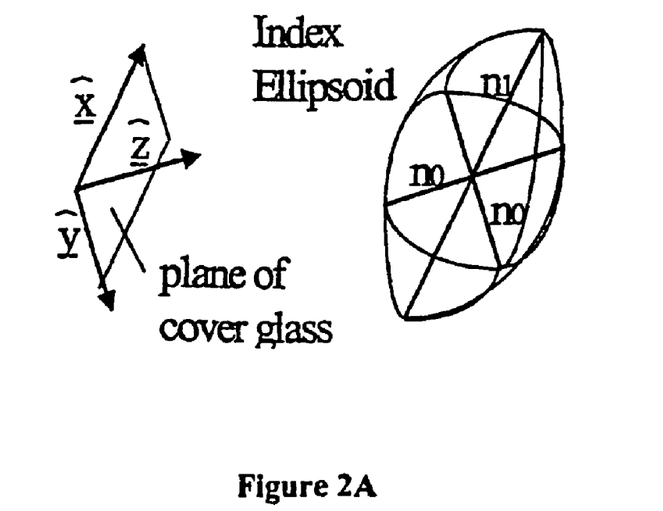
FIG. 2A shows the index ellipsoid in the bulk of the cell that is away from the influences of the alignment layers and under no-field conditions.

Light travelling through a crystalline medium can be considered as the superposition of two propagating modes. These two modes travel along with different phase velocities, that may be calculated using the geometric construction of the index ellipsoid (indicatrix). A uniaxial medium is characterised by an indicatrix that is an ellipsoid of revolution around an axis that is usually parallel to the director of the liquid crystal. The long axis of the ellipsoid has a length equal to the extraordinary refractive index $n_e$, whereas both short axes lie normal to the long axis taking the same length, $n_O$ (ordinary refractive index), as shown in FIG. 2A. Construct a plane perpendicular to the wavefront propagation vector. The intersection of this plane with the ellipsoid defines an ellipse (index ellipse). The directions of the major and minor axes of this ellipse define the two orthogonal polarisation modes, while the lengths of these two axes define the refractive index experienced by the corresponding mode.

Where the liquid crystal cell type to be used is a variable birefringence cell, what is required from the cell structure is that it should be capable of 'out-of-plane' tilt, where the plane refers to the plane of the cover glass. Suitable cell structures are the planar-to-homeotropic Freederickz cell, a π cell and a HAN (Hybrid Aligned Nematic) cell. Vertically aligned nematics may also be used. Similar cells employing twist as well as an out-of-plane tilt may be suitable. An example of twist is a twisted nematic cell in which the direction of uniaxial alignment on the front cover glass is orthogonal to that on the rear cover glass, although in both cases the alignment is in a plane parallel to the cover glass.

For the Freederickz cell, when no electric field is applied the index ellipsoid is aligned with the long axis parallel to the cover glass by employing suitable alignment layers. However, when field is applied across the material the director tilts away from the plane of the cover glass and towards the direction of the applied field. With continued reference to FIG. 2A, define the two short axes of the index ellipsoid to be in, and perpendicular to, the plane of the cover glass respectively. Let the vector unit $\hat{y}$ be parallel to the short axis in the plane of the cover glass, the unit vector $\hat{z}$ be perpendicular to the cover glass, and define the unit vector $\hat{x}$ so that $\hat{x}$, $\hat{y}$ and $\hat{z}$ form an orthogonal right-handed set. Hence the long axis of the index ellipsoid is always in the x-z plane.

Figure 2B:
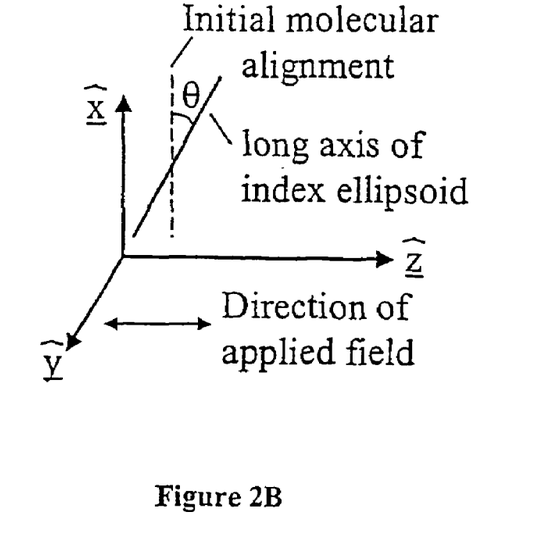
FIG. 2B shows the direction of tilt variation under applied field conditions.

Referring now to FIG. 2B, let the initial alignment direction of the long-axis of the index ellipsoid be in the $\hat{x}$ direction. On application of any electric field in the $\hat{z}$ direction (normal to the glass), the long axis rotates in the x-z plane by angle θ. By considering the index ellipsoid, it is clear that for light polarised in the $\hat{y}$ direction, the same effective refractive index, $n_O$, is experienced, independent of θ. However, light polarised in the $\hat{x}$ direction experiences a modified refractive index, depending on θ. Changing the strength of the applied field changes θ, and hence changes the refractive index experienced by the light polarised in the $\hat{x}$ direction. In this way the phase of components of light travelling along the $\hat{x}$ direction is modulated in a continuous (analogue) way.

Consider linearly polarised light passing through such a liquid crystal, behind which there is a quarter-wave plate and then a mirror. On the way towards the quarter-wave plate and mirror, the polarisation component polarised in the $\hat{x}$ direction experiences the applied index change (or phase modulation), denoted by $n_{APP}$, while the component in the $\hat{y}$ direction does not, and instead experiences a refractive index, $n_0$, that is independent of the applied field. The orientation of the quarter-wave plate is such that these two polarisation components are exchanged. Hence the one component perceives the applied phase modulation on propagation towards the quarter-wave plate and mirror, while the orthogonal component perceives the (same) applied phase modulation after reflection from the mirror and passing back through the quarter-wave plate. Hence the phase modulation is polarisation-independent, as may be proved by Jones matrix analysis. For a liquid crystal layer thickness of t, both polarisation components will perceive a net phase modulation of $2\pi(n_0+n_{APP})$ t/$\lambda$, where $n_{APP}$ is a continuous function of the applied voltage.

Figure 3:
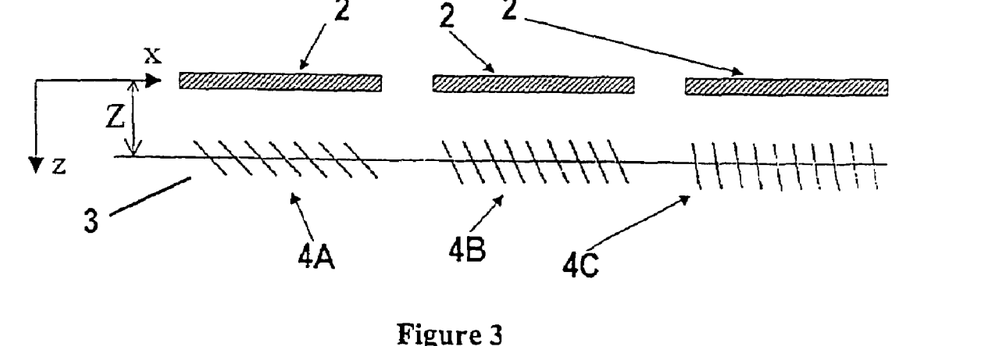
FIG. 3 is a partial cross-sectional schematic view through an SLM showing varying alignment with back electrode potential per pixel.

Referring again to FIG. 2A, let the planes of the front and back electrodes be parallel to the xy plane and let the director tilt be in the xz plane. In FIG. 3, now consider a cross-sectional plane through the liquid crystal 3, again parallel to the xy plane and at a distance Z from the back electrodes 2. The back electrodes 2 are pixellated. To steer a beam incident on an area of the modulator to a desired target direction, a spatially-varying phase modulation characteristic is selected to provide the desired deflection, thus to cause the device to mimic a tilted mirror. Then, the array of back electrodes defining the phase modulating elements of that area are operated so as to cause the phase modulation applied by the overlying liquid crystal to approximate the desired characteristic. This is achieved by applying step voltages to sequential back electrodes, the voltages stepping from a selected minimum up to a level at which the overlying liquid crystal is providing a selected maximum phase shift. The step voltages repeat across the array, so that the voltage characteristic is typically spatially periodic. The number of back electrodes per spatial period is variable according to the desired characteristic. The number will also be dependent on the resolution of the device. The smaller the electrodes, the closer the approximation can be to the desired characteristic.

A second beam incident on a second spatially distinct area of the device is steered to a different direction by selecting a different phase characteristic for that second area. This second area is likely to have a different distribution of voltages. Therefore in front of each particular back electrode the liquid crystal director will have a tilt 4A-4C specific to the applied field. Although this tilt varies with the distance Z from the back electrode, across any pixel and at any fixed Z the tilt is substantially uniform. In practice there may be edge effects such that the tilt in front of the edges of each pixel is modified due to correlations with the tilt in front of the adjacent pixels, as will be described next.

In addition to a dependence on an applied electric field, the director orientation also depends on the orientation of its neighbouring molecules, i.e. the orientations are correlated, due to elastic forces, with a typical correlation length of the order of a micron, which is longer than the dead-space for typical sub-micron CMOS processes.

There is no voltage applied by the dead-space and hence the director orientation above the dead-space may be determined by the orientation of the liquid crystal above the active pixels on either side of the dead-space, as well as by any fringe fields from these adjacent pixels. Additionally, the electric field inside the liquid crystal above the dead-space takes some average of the electric field above the two pixels either side, enhancing the correlation and increasing the correlation length for the director orientation.

Therefore the phase modulation imposed by the dead-space may be considered to be some weighted average of the phase modulation imposed by the adjacent pixels, where the weight is likely to depend on the distance from each adjacent pixel. The simplest model for such behaviour is that the phase modulation varies linearly across the dead-space, as shown by the solid line in FIG. 4 for the case of a regular 8 level 1-D phase modulation.

Figure 4:
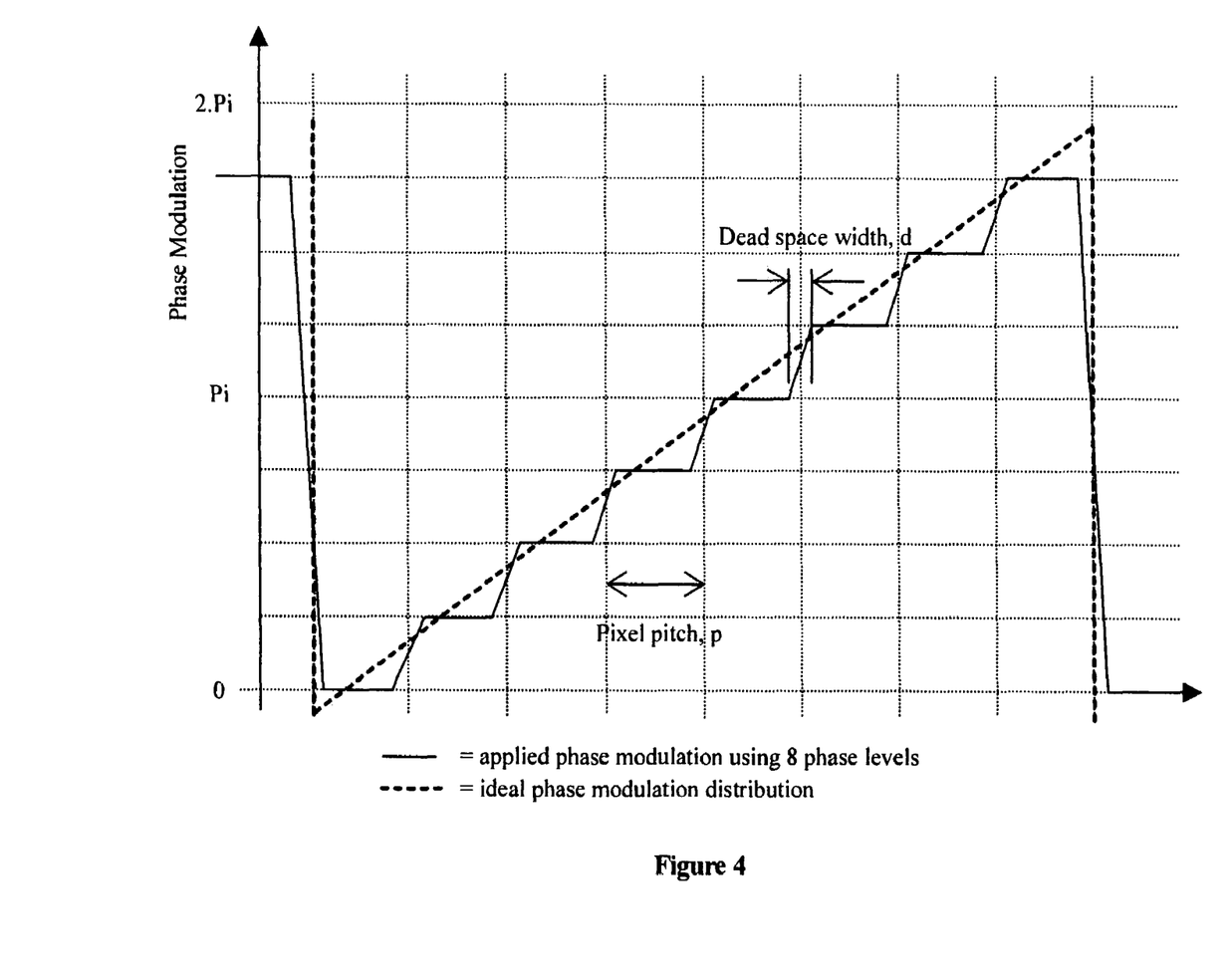
FIG. 4 shows a graph comparing ideal phase modulation with 8-phase level modulation.

Referring now to FIG. 4, a phase modulation characteristic is shown for a periodic eight-pixel distribution. The back electrode of the first pixel is provided with a voltage with respect to the front electrode so as to give rise to a selected minimum phase shift and sequentially adjacent pixels are provided with an increasing voltage differential with respect to the front electrode until the eighth pixel. At the eighth pixel the voltage on the back electrode with respect to the front electrode is such as to provide near a selected maximum phase shift by the liquid crystal layer. So that the entire (here one-dimensional) array can provide the desired characteristic, the ninth pixel is provided with the same voltage conditions as the first pixel and the characteristic then repeats to the sixteenth pixel before again repeating.

The following paragraphs describe the improvements in the insertion loss that would be obtained if the dead-space were altered so as to reflect the light incident upon it. This improvement is due to the correlations in the molecule orientation caused by elastic and electric forces.

If the dead-space can be altered so as to reflect the light incident upon it, such that the reflected light is substantially in-phase with the light reflected from the active pixels, then the phase modulation created by the director correlations can improve the device diffraction efficiency and can recover some or most of the insertion loss penalty due to the dead-space. Also shown in FIG. 4 is the ideal phase modulation distribution, as a dashed line. The lines in the figure show that the phase modulation above the dead-space is actually closer to the ideal distribution than it would be in the absence of any dead-space, except at the end of each cycle where there is a 'flyback'. For a regular 1-D m-level phase modulation, with uniform chase modulation above the active area of each pixel, and linear phase variation across the dead-space, as shown in FIG. 4 for the example of m=8 and a period of 8 pixels, the diffraction efficiency into the first order can be derived using Fourier series analysis. The results show that apart from the flyback dead-space, the diffraction efficiency is improved by ideal reflecting dead-space, compared to a device without any dead-space, and that this improvement increases with the value of d/p. The flyback, however, reduces the diffraction efficiency. Note that if more phase levels are available then fine adjustments of each level could be used to minimise the impact of the flyback dead-space and maximise the diffraction efficiency. Note also, that if the flyback is outside the active area of illumination, the efficiency penalty due to flyback is removed.

Figure 5:
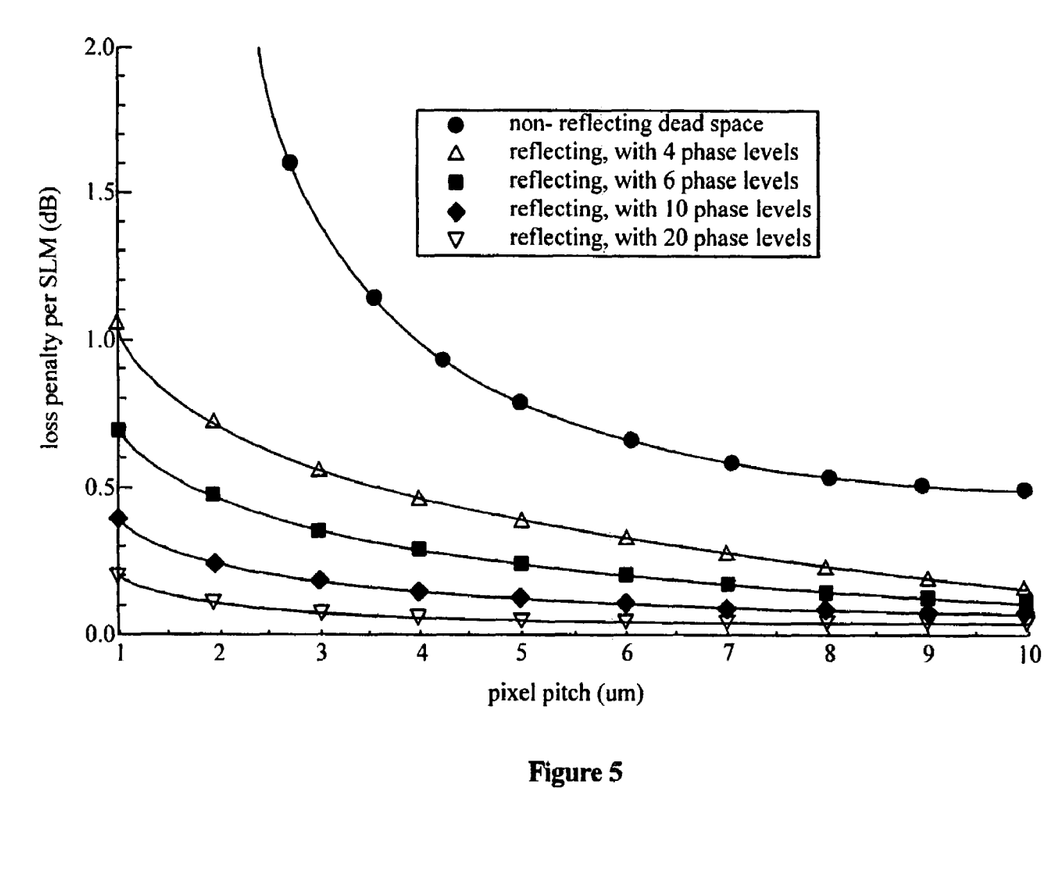
FIG. 5 shows the loss penalty for one-dimensional phase modulation due to inter-pixel dead-space.

Assuming the light reflected from the dead-space to be perfectly in-phase with the light reflected from the back electrodes, and that the reflectivities of the back electrodes and dead-space are identical, the residual insertion loss penalty due to the dead-space for the first (and strongest) diffraction order has been calculated and is shown in FIG. 5 as a function of the pixel pitch, for contours of the number of phase levels, and for a dead-space width of 0.5 μm. The results show that the residual loss penalty decreases with the number of phase levels. This is because for m phase levels then a fraction (m−1)/m of the dead-spaces acts to improve the diffraction efficiency while a fraction 1/m is flyback dead-space which decreases the diffraction efficiency. FIG. 5 also shows the insertion loss penalty for normal dead-space and a 1-D SLM. All points on the graph were calculated assuming that the number of phase levels is equal to the number of pixels per period.

The results in the figure show clearly that three significant improvements in device performance may be achieved by making the dead-space reflective. Firstly the loss penalty due to the dead-space is reduced significantly. Secondly, for an acceptable loss penalty, much smaller pixels may be used, allowing the fabrication of much more compact optical crossbar switches, because the length of the beam-steering region is proportional to the square of the pixel pitch. Other routing architectures in which the physical length is linearly proportional to the pixel pitch may also thereby be more compact. Thirdly, the results in the figure are for a dead-space width of 0.5 μm, corresponding to a CMOS feature size of 0.25 μm.

Comparison with the results in FIG. 1, bearing in mind the need to halve the values on the graph to convert to 1-D phase modulation, shows that the dead-space loss penalties for this width of reflecting dead-space are reduced to a similar level to those with a much smaller feature size of 70 nm, and hence a much lower available voltage. Therefore the results show that, for an acceptable loss penalty, larger CMOS processes may be used allowing the fabrication of switches with a faster reconfiguration time as explained previously. Therefore a reflecting dead-space facilitates improvements in switch insertion loss, physical size and switching time. The crosstalk is improved as the light incident on the dead-space is reflected back out again instead of bouncing around inside the substrate.

While the above-described improvements in performance are specific to phase-modulating pixels, there are other types of SLM for routing applications e.g. PDLC SLMs, in which the pixels modulate amplitude and/or birefringence and/or phase. Such devices may also be improved by making the dead-space reflective.

The following paragraphs describe an exemplary device n which a layer of circuitry is used to reflect the light passing through the dead-space.

Figure 6A:
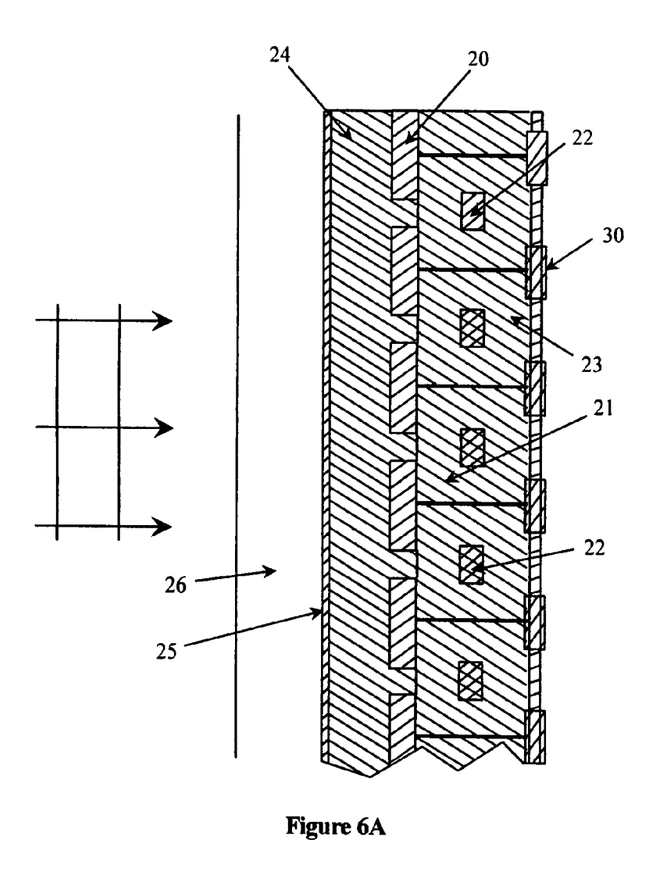
FIGS. 6A and 6B show, respectively, a cross-sectional view and an elevation of a first embodiment of a beam steering device with reflecting dead-space in accordance with the invention.
Figure 6B:
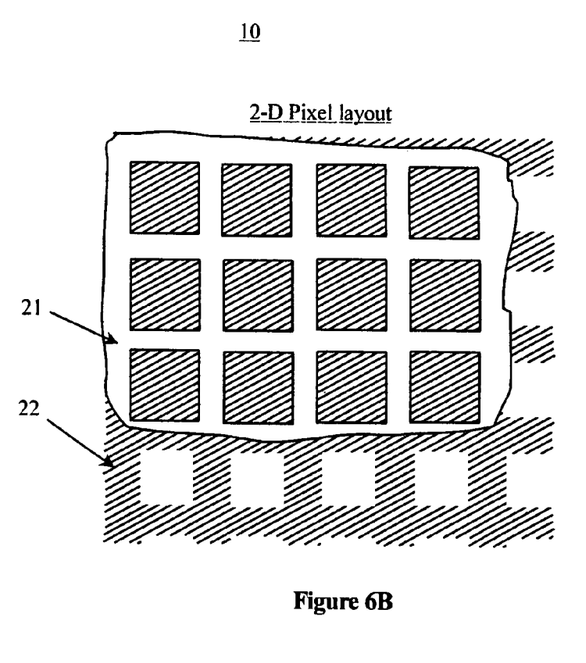

CMOS fabrication processes allow several overlying layers of circuitry, with connections between the layers as necessary. Referring first to FIGS. 6A and 6B, an SLM 10 has drive circuitry 30 associated with the VLSI backplane for controlling phase changes in each pixel, and a top layer of circuitry 20 i.e. the circuitry most distant from the substrate, which may be optical quality metal, forming the back electrodes and back reflectors. Over and between the back electrodes is a liquid crystal layer 24, and over the liquid crystal layer is a transparent common electrode 5 layer 25 deposited on a cover glass 26.

The top layer 20 is deposited on a first optical planarising layer 21 that creates an optically flat surface on top of the drive circuit components for each pixel. Connections are made between the drive circuits 30 and back electrodes 20. Reflecting dead-space is implemented by introducing an intermediate layer 22 of circuitry in between the back electrodes 20 and the drive circuitry 30. The intermediate layer 22 consists of a mesh of metal, which may be of optical quality, such that when viewed normally (at right angles to the plane of the electrodes) there appears to be continuous coverage of the substrate with metal.

The intermediate layer 22 is separated from the back electrodes 20 and drive circuits 30 by a second optical quality planarising layer 23. For optimum effects, the separation from the back electrodes 20 is such that the light reflected from the dead-space 22 is in-phase with that reflected from the back electrodes 20, taking into account the mean wavelength to be used and the mean angle of incidence. Hence the path length difference between the light reflected from the dead-space mesh 22 and the light reflected from the back electrodes 20 is an integral number of wavelengths, n, inside the optical media at the design wavelength and design angle of incidence.

However, in practice the devices are used for a range of wavelengths. Changing the actual wavelength from the mean design value changes the relative phase between the light reflected from the dead-space mesh and the light reflected from the back electrodes, and hence results in partially destructive interference, thereby increasing the insertion loss penalty due to the dead-space. At a given wavelength difference from the mean design value, this effect gets worse as the integer n increases. Hence this integer, n, should be as small as possible in order to maximise the wavelength range of the device.

Figure 7A:
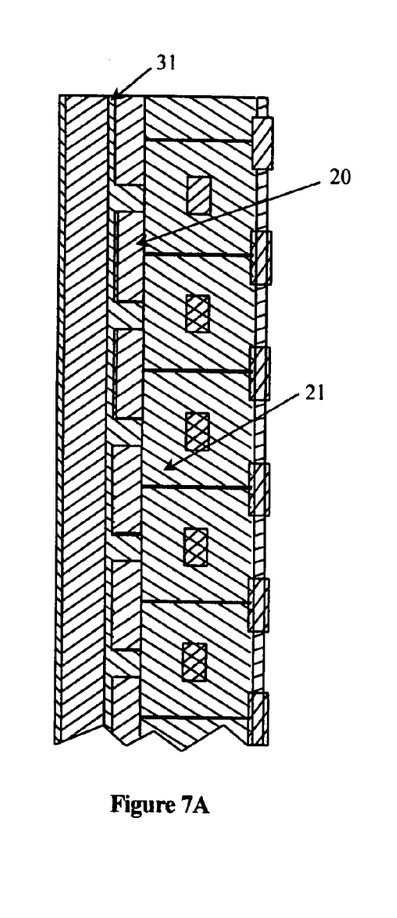
FIGS. 7a and 7B, respectively, show a cross-sectional view and an elevation of a second embodiment of a beam steering device with reflecting dead-space in accordance with the invention.
Figure 7B:
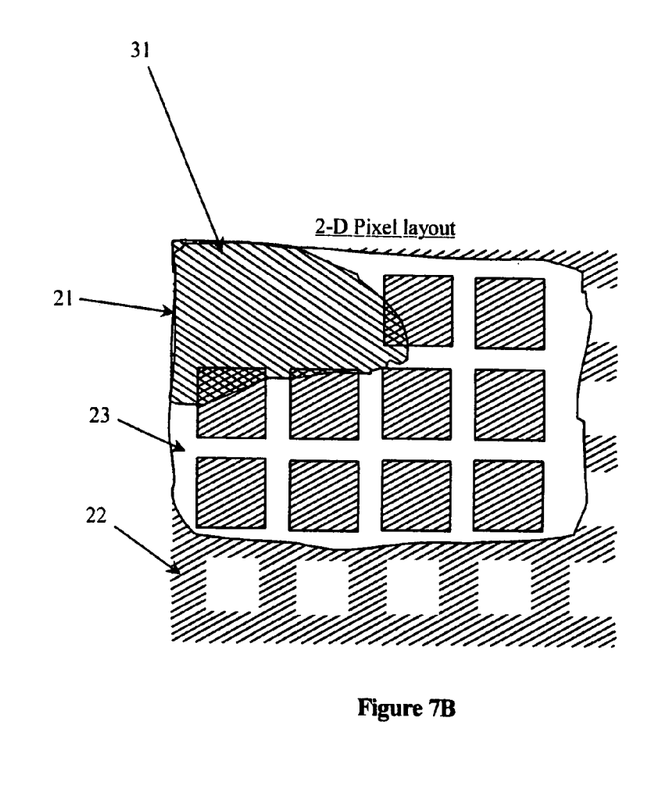

In practice the back electrodes 20 have a finite depth of, typically, a few 100's of nanometres. Hence there will be inevitably some additional phase modulation applied by the depth of liquid crystal directly in between and below the top surface of the back electrodes. This could be avoided by depositing a very thin damascene layer 31 on the back electrodes, as shown in FIGS. 7A and 7B. This structure also has the advantage of providing a uniform surface for application of the liquid crystal alignment layer, and therefore should ensure good alignment of the liquid crystal above the dead-space.

Figure 8A:
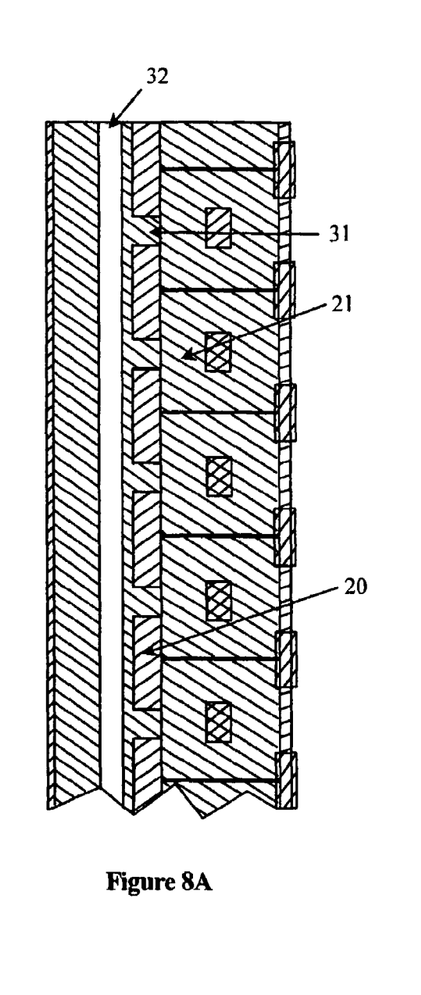
FIGS. 8A and 8B, respectively, show a cross-sectional view and an elevation of a third embodiment of a beam steering device with reflecting dead-space in accordance with the Invention.
Figure 8B:
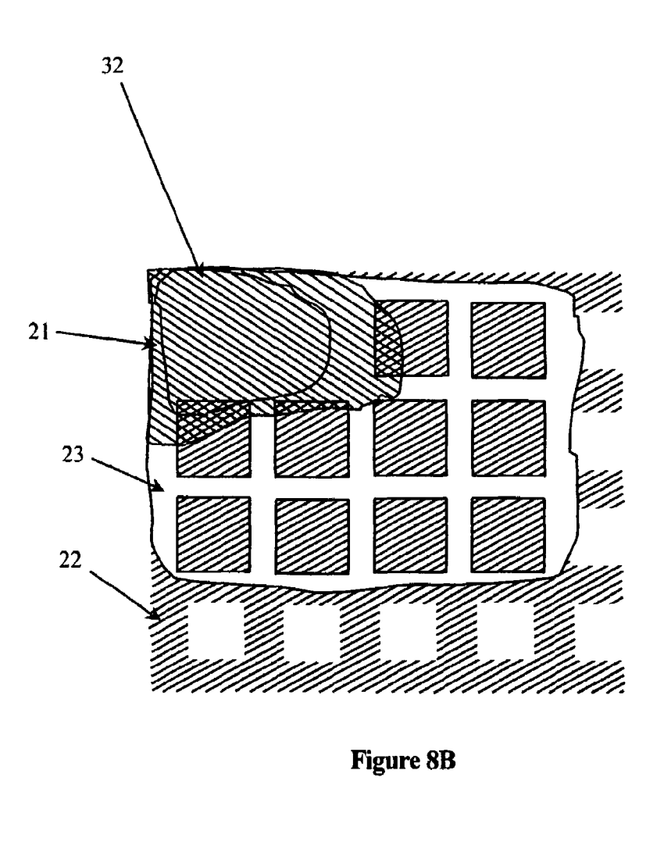

While FIGS. 6A, 6B, 7A and 7B show the generic case of an SLM with reflecting dead-space, for a polarisation independent multiple phase modulating SLM it is advantageous to include a quarter-wave plate 32 intermediate the back electrodes and liquid crystal, as shown in FIGS. 8A and 8B. Again, for successful operation of the quarter-wave plate and reflecting dead-space it may be advantageous for there to be also a very thin damascene layer 31 between the back electrodes and quarter-wave plate, as shown in FIGS. 8A and 8B. Again such a structure would improve the quality of the alignment layer, used in this case to align the quarter-wave plate.

In the illustrated embodiment, the intermediate metal layer 22 extends only to fill the space between the back electrodes, in other embodiments the metal may extend further. It will be understood however that if switching of the back electrodes takes place, it may be undesirable or desirable for the metal layer to extend beneath the back electrodes for capacitance effects. In yet another embodiment, the metal layer does not extend over the entire spacing between the back electrodes, but instead extends over part of the spacing.

In a further embodiment the reflecting layer could be formed by adapting the lightshield processes that may be used to protect the semiconductor devices in the substrate from visible light.

In an alternative embodiment, the beam steering device has plural front electrodes per back pixel electrode. Different voltages are applied to these front electrodes to vary the phase shift across the pixel so that there is a ramp across each pixel formed of upward (or downward) steps in accordance with the front electrodes. Hence instead of each pixel electrode representing a single step change in effect on the liquid crystal overlying it, the desired ramp in phase shift is more closely followed. As an example, where three front electrodes are provided per pixel electrode, the voltages applied to the front electrodes may be repeated across each pixel electrode, and be selected so that the centremost front electrode represents the core voltage for the pixel, with the voltages on the adjacent front electrodes being respectively above and below that applied to the centremost electrode. Where the pixel electrodes rise in voltage from one to the next, there will be one higher voltage front electrode to one side of the inter-pixel space, and one lower voltage front electrode to the other side of the space. Consideration of this state shows that the average state of the liquid crystal device over the space will be such as to smooth the transition between the pixels.

Figure 10:
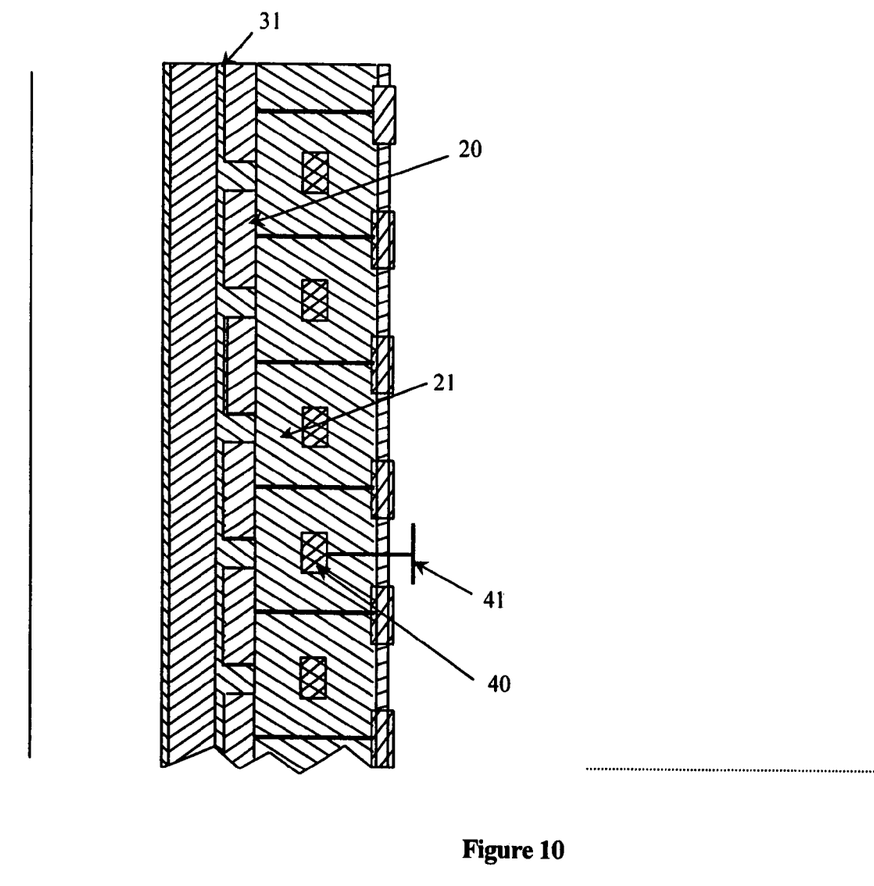
FIG. 10 shows a further embodiment of a beam steering device accordance with the invention, in which a portion of the reflective layer is isolated from other portions, and connected via circuitry to a selected potential.

In the described embodiment, the metal layer 22 operates only as a reflective layer. To achieve this it may be left electrically floating if desired, or it may be connected to a desired potential. In another embodiment, the metal layer is connected to a single selected potential to improve electrical operation. In yet another embodiment, the reflective mesh forming the layer 22 is interrupted and portions between back electrodes are mutually isolated and connected to different selected potentials, for instance a potential between the potentials of the two nearest back electrodes. This may affect the edges. This latter embodiment is shown in FIG. 10, in which one portion 40 of the mesh is isolated from the other portions, and circuitry 41 connects to a wiring on the substrate, in turn connected to a selected potential.

In yet a further embodiment, there is no intermediate layer, but instead the drive circuitry extends into the spaces between the back electrodes and has a portion which forms the reflective layer.

Figure 9:
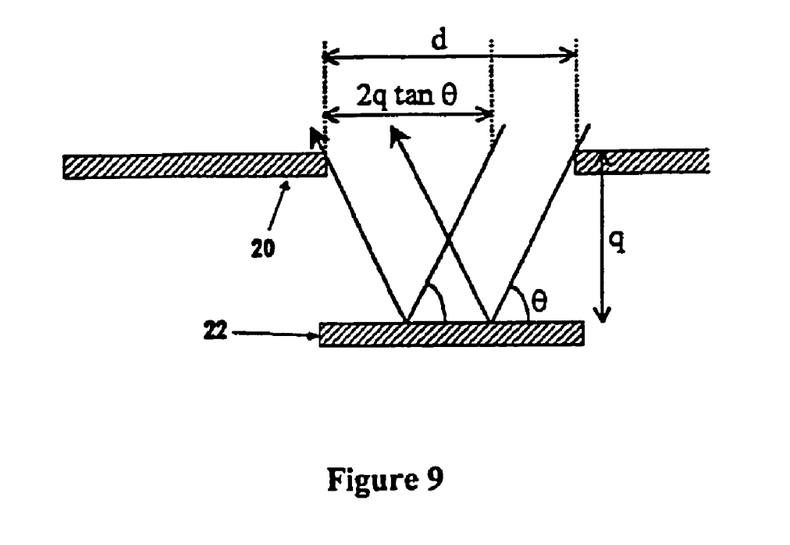
FIG. 9 shows a partial cross-sectional view through a beam steering device in accordance with the invention showing the effects of off-normal incidence.

When used in a routing configuration the angle of incidence should be kept reasonably low. As shown in FIG. 9, the effect of off-normal incidence is such that a fraction of the light incident on the dead-space mesh is reflected back into the substrate from the rear side of the back electrodes. With continued reference to FIG. 9, for a dead-space mesh positioned a distance q behind the front surface of the back electrodes, and an angle of incidence θ measured inside the planarising layer, the light incident over a fraction 2q tan θ/d of the dead-space is 'lost' in this manner. The effect on the diffraction efficiency may be calculated using Fourier series analysis, and treating this light leakage as being equivalent to multiplying the phase modulating hologram by another pixel 'window' function with an amplitude of zero over a fraction 2q tan θ/d of the dead-space and an amplitude of unity elsewhere. Hence for 1-D phase modulation and at a design wavelength the effect of the angle of incidence is (to first order) to multiply the diffraction efficiency by a factor given in eqn (3):

$$\text{actual 1-D efficiency} = (1 - 2 \cdot q \cdot \tan \theta / p)^2 \cdot \text{efficiency in normal incidence} \quad (3)$$

Therefore increasing the angle of incidence reduces the diffraction efficiency. The diffraction efficiency also decreases with the depth, q, of the planarising layer between the dead-space mesh and the back electrodes. Hence it is again advantageous to keep as low as possible the integer number of wavelengths in the path difference between the light reflected from the dead-space and that reflected from the back electrodes.

Reflecting dead-space SLMs may also be used with binary phase devices based on in-plane tilt, although the physics of the phase modulation above the dead-space is different.

In an alternative solution, the back electrodes may be pixellated, but adjacent electrodes may be disposed in different planes to substantially eliminate dead-space.

Although the embodiments are described as having a front electrode that is common to the pixel area, the invention is also applicable to other situations. In one alternative, there is provided a single front electrode per pixel.

An embodiment of the present invention has been described with particular reference to the examples illustrated. However, it will be appreciated that variations and modifications may be made to the examples described within the scope of the present invention.

The invention claimed is:

1. An optical device comprising an array of elements, a beam of light being incident upon said array of elements, each element having a reflective back electrode and a single transparent front electrode common to the array, the back and front electrodes being disposed respectively behind and in front of a liquid crystal layer, the back electrodes being spaced apart to define said array, a waveplate disposed to provide polarisation independence and a reflective layer disposed behind the back electrodes to reflect light incident in the spaces between the back electrodes substantially in phase with the light reflected from the back electrodes, said array of elements to steer said beam of light.

2. The device of claim 1, wherein there is provided a single front electrode per element of said array of elements.

3. The device of claim 1, wherein the front electrode is common to the said array of elements.

4. The device of claim 1, having drive circuitry on a substrate, and a planarising layer disposed on said drive circuitry, wherein said back electrodes are disposed on said planarising layer, and respective wirings pass through said planarising layer from said back electrodes to said drive circuitry, and wherein a portion of said drive circuitry provides said reflective layer.

5. The device of claim 1, having drive circuitry on a substrate, and a planarising layer disposed on said drive circuitry, wherein said back electrodes are disposed on said planarising layer, and respective wirings pass through said planarising layer from said back electrodes to said drive circuitry, and wherein said reflective layer is disposed within said planarising layer.

6. The device of claim 1, having drive circuitry on a substrate, a first planarising layer disposed on said drive circuitry wherein said reflective layer is disposed on said first planarising layer, and a second planarising layer disposed on said circuitry layer and said first planarising layer wherein said back electrodes are disposed on said second planarising layer, wherein respective wirings pass through said planarising layers from said back electrodes to said drive circuitry.

7. The device of claim 1, having a further planarising layer disposed over said back electrodes.

8. The device of claim 1, wherein said wave plate is a quarter wave plate disposed over said back electrodes.

9. The device of claim 1, wherein said reflective layer is composed of metal.

10. The device of claim 1, wherein said reflective layer extends only to substantially fill said spaces between said back electrodes.

11. The device of claim 1, wherein said reflective layer extends beneath said back electrodes.

12. The device claim 1, wherein said reflective layer extends substantially level with said back electrodes.

13. The device of claim 1, wherein said reflective layer extends only partway across said spaces.

14. The device of claim 1, further comprising circuitry for connecting at least a portion of said reflective layer to a selected potential.

15. The device of claim 1, wherein each element has plural front electrodes.

16. A method of operating on a beam of light, the method comprising:

causing said beam of light to be incident upon a reflective liquid crystal device; selecting a desired spatial phase modulation characteristic for said liquid crystal device thereby to provide a deflection of said beam of light to steer said beam of light from a first direction to a desired second direction; and providing a spatial distribution of phase levels across said liquid crystal device to at least approximate to said desired characteristic; wherein the step of providing a spatial distribution of phase levels comprises driving said liquid crystal at sequential spaced driving locations by providing electrodes at said discrete driving locations, and applying voltages to sequential electrodes to produce rising discrete phase levels due to the liquid crystal; and smoothing transitions in phase between said spaced driving locations by providing further locations between said spaced driving locations, and reflecting said light through said liquid crystal in said further locations by providing spaces between the electrodes at said further locations and providing reflective elements in the spaces and behind the electrodes; wherein said electrodes are reflective and disposed at a distance behind said electrodes such that light reflected thereby leaves said liquid crystal device substantially in phase with light reflected by said electrodes whereby said liquid crystal device is reflective.

17. A method according to claim 16, comprising providing a reflective layer disposed behind the electrodes whereby said liquid crystal device is reflective.

18. An optical device comprising an array of elements, a beam of light being incident upon said array of elements, each element having a reflective back electrode and a single transparent front electrode common to the array, the back and front electrodes being disposed respectively behind and in front of a liquid crystal layer, the back electrodes being spaced apart to define said array, and a reflective layer disposed behind the back electrodes to reflect light incident in the spaces between the back electrodes substantially in phase with the light reflected from the back electrodes, the device having a further planarising layer disposed over said back electrodes, said array of elements to steer said beam of light.

19. An optical device comprising an array of elements, a beam of light being incident upon said array of elements, each element having a reflective back electrode and a single transparent front electrode common to the array, the back and front electrodes being disposed respectively behind and in front of a liquid crystal layer, the back electrodes being spaced apart to define said array, and a reflective layer disposed behind the back electrodes to reflect light incident in the spaces between the back electrodes substantially in phase with the light reflected from the back electrodes, the device having a further planarising layer disposed level with said back electrodes, said array of elements to steer said beam of light.

20. The optical device of claim 1 includes 8-phase levels increasing stepwise across adjacent pixels in $\frac{1}{4}\pi$ increments.

21. The method of claim 16 wherein said step of providing a special distribution of phase levels includes 8-phase levels increasing stepwise across adjacent pixels in $\frac{1}{4}\pi$ increments.

22. The optical device of claim 18 includes 8-phase levels increasing stepwise across adjacent pixels in $\frac{1}{4}\pi$ increments.

23. The optical device of claim 19 includes 8-phase levels increasing stepwise across adjacent pixels in $\frac{1}{4}\pi$ increments.

* * * * *